United States Patent
Lee et al.

[11] Patent Number: 6,146,103
[45] Date of Patent: Nov. 14, 2000

[54] MICROMACHINED MAGNETOHYDRODYNAMIC ACTUATORS AND SENSORS

[75] Inventors: Abraham P. Lee, Walnut Creek; Asuncion V. Lemoff, Union City, both of Calif.

[73] Assignee: The Regents of the University of California, Oakland, Calif.

[21] Appl. No.: 09/170,614

[22] Filed: Oct. 9, 1998

[51] Int. Cl.[7] .................................................. H02K 44/02
[52] U.S. Cl. ............................................................ 417/50
[58] Field of Search ........................................ 417/48, 50

[56] References Cited

U.S. PATENT DOCUMENTS

| | | | |
|---|---|---|---|
| 4,808,079 | 2/1989 | Crowley et al. | 417/50 |
| 5,256,036 | 10/1993 | Cole | 417/50 |
| 5,632,876 | 5/1997 | Zanzucchi et al. | 417/50 |
| 5,685,698 | 11/1997 | Smoll | 417/50 |
| 5,685,966 | 11/1997 | Aaron et al. | 417/50 |
| 5,846,396 | 12/1998 | Zanzucchi et al. | 417/50 |
| 5,975,855 | 11/1999 | Ensberg et al. | 417/50 |
| 5,993,164 | 11/1999 | Diaz | 417/50 |
| 6,012,902 | 1/2000 | Parce | 417/50 |

*Primary Examiner*—Erick Solis
*Attorney, Agent, or Firm*—John P. Wooldridge; L. E. Carnahan; Alan E. Thompson

[57] ABSTRACT

A magnetohydrodynamic (MHD) micropump and microsensor which utilizes micromachining to integrate the electrodes with microchannels and includes a magnet for producing magnetic fields perpendicular to both the electrical current direction and the fluid flow direction. The magnet can also be micromachined and integrated with the micropump using existing technology. The MHD micropump, for example, can generate continuous, reversible flow, with readily controllable flow rates. The flow can be reversed by either reversing the electrical current flow or reversing the magnetic field. By mismatching the electrodes, a swirling vortex flow can be generated for potential mixing applications. No moving parts are necessary and the dead volume is minimal. The micropumps can be placed at any position in a fluidic circuit and a combination of micropumps can generate fluidic plugs and valves.

23 Claims, 6 Drawing Sheets

MICROMACHINED MAGNETOHYDRODYNAMIC ACTUATORS AND SENSORS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to microfluidics, particularly to using magnetohydrodynamics (MHDs) for microfluid propulsion, and more particularly to micromachined MHD actuators, such as micropumps, and to microsensors, which may be utilized in microfluidic systems.

Microfluidics is the field for manipulating fluid samples and reagents in minute quantities, such as in micromachined channels, to enable hand-held bioinstrumentation and diagnostic tools with quicker process speeds. The ultimate goal is to integrate pumping, valving, mixing, reaction, and detection on a chip for biotechnological, chemical, environmental, and health care applications. Most micropumps developed thus far have been complicated, both in fabrication and design, and often are difficult to reduce in size, negating many integrated fluidic applications. Most pumps have a moving component to indirectly pump the fluid, generating pulsatile flow instead of continuous flow. With moving parts involved, dead volume is often a serious problem, causing cross-contamination in biological sensitive processes.

The present invention utilizes MHDs for microfluid propulsion and fluid sensing, the microfabrication methods for such a pump, and the integration of multiple pumps for a microfluidic system. MHDs is the application of Lorentz force law on fluids to propel or pump fluids. Under the Lorentz force law, charged particles moving in a uniform magnetic field feel a force perpendicular to both the motion and the magnetic field. It has thus been recognized that in the microscale, the MHD forces are substantial for propulsion of fluids through microchannels as actuators, such as a micropump, micromixer, or microvalve, or as sensors, such as a microflow meter, or viscosity meter. This advantageous scaling phenomenon also lends itself to micromachining by integrating microchannels with micro-electrodes. When electrodes are mismatched in the flow direction, a resultant swirling or mixing motion is produced for vortex generation. By using two pairs of MHD electrodes with one pair as a flow meter and the other pair as an opposing pump to stop flow, a valve plug can be realized.

SUMMARY OF THE INVENTION

An object of the present invention is to utilize MHD in micromachined actuators and sensors.

A further object of the invention is to utilize MHD for microfluid propulsion.

A further object of the invention is to provide micromachined MHD actuators.

A further object of the invention is to provide micromachined MHD sensors.

Another object of the invention is to provide an MHD micropump utilizing micromachining to integrate the electrodes with microchannels.

Another object of the invention is to provide a micromachined MHD vortex generator.

Another object of the invention is to provide an MHD microdevice having no moving parts and with minimal dead volume.

Another object of the invention is to provide a micromachined valve plug arrangement.

Another object of the invention is to provide a micromachined MHD flow meter.

Another object of the invention is to provide micromachined MHD actuators and sensors utilizing a glass-silicon-glass sandwich generated by anodic bonding of glass to silicon.

Another object of the invention is to provide a microfluidic system involving the integration of multiple MHD micropumps.

Other objects and advantages of the present invention will become apparent from the following description and accompanying drawings.

Broadly, the invention involves the use of MHD for microfluid propulsion in microfluidic systems, and more specifically, to micromachined MHD actuators and sensors, such as pumps, mixers, valves, and meters (flow or viscosity). The MHD micropump, for example, utilizes micromachining to integrate the electrodes with microchannels. Magnetic fields perpendicular to the electrical current direction can be applied externally via permanent magnets or tunable solenoids. Also, the magnets (which may be permanent magnets or AC magnets) can be micromachined and integrated in the microdevice. The MHD micropump, for example, can generate continuous flow or reversible flow with readily controllable flow rates. By offsetting the electrodes, a swirling vortex flow can be generated for potential mixing applications. No moving parts are necessary and the dead volume is minimal. The micropump, for example, can be placed at any position in the fluidic circuit as an element, and by using a combination of micropumps one can generate fluidic plugs and valves. The micropump, for example, can be fabricated by lithographic technologies and micromachining for mass production and low cost parts. Applications for such micromachined MHD actuators and sensors are numerous, including biotech instrumentation, environmental sensing/monitoring devices, medical devices for analyzing and processing biological samples, pumps for drug delivery, etc.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 10C shows a cross-section with current to stop fluid flow.

DETAILED DESCRIPTION OF THE INVENTION

The present invention involves utilizing MHD for microfluid propulsion, the microfabrication methods for an MHD micropump, and the integration of multiple micropumps into a microfluidic system. An MHD micropump, for example, will generate continuous, reversible flow, with readily controllable flow rates. By offsetting the electrodes, a swirling vortex flow can be generated for potential mixing applications. No moving parts are necessary and the dead volume is minimal. The micropumps can be placed at any position in the fluidic circuit as an element and the combination of them can generate fluidic plugs and valves. By placing two pairs of MHD electrodes adjacent to each other, a valve plug can be realized by using one pair as a flow meter and the other pair as a pump to apply pressure in the opposite directions. The electrodes can also act as a flow meter in microchannels by measuring the voltage as fluid flows through a magnetic field. The microdevices can be fabricated by lithographic technologies and micromachining for mass production and low cost parts. An MHD test device has shown that pumping of a saline (a regular buffer solution) can be done at the microscale range with 6–10 V applied. The magnetic fields can be applied externally via permanent magnets, AC magnets, or tunable solenoids.

MHD microflow has several advantages, including multiple functionality, integrated systems, continuous flow, reversible flow, and more uniform flow; with the disadvantages being the requirements for a magnet and conductive fluid medium. Thus the MHD microdevices will generally not operate satisfactorily unless the fluid medium is electrically conductive. MHD microdevices described hereinafter involve actuators and sensors, the actuators including pumps, mixers, and valves, while the sensors include flow meters and viscosity meters. The MHD microdevices operate under the Lorentz force, wherein charged particles moving in a uniform magnetic field feel a force perpendicular to both the motion and the magnetic field.

Figure 1:
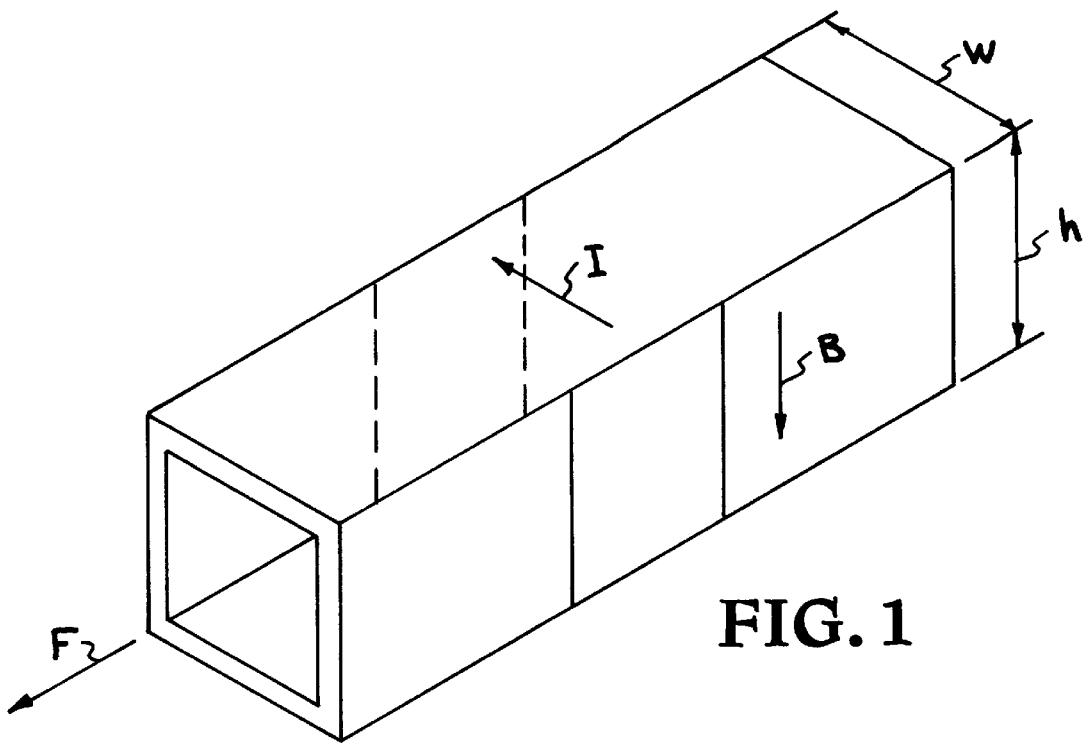
FIG. 1 schematically illustrates an MHD pump made in accordance with the present invention.

FIG. 1 schematically illustrates an MHD pump, wherein a conducting fluid passing through a channel having a width w and height h, feels a force, indicated by Arrow F, which is perpendicular to the direction of the current, indicated by the Arrow I, and the direction of the magnetic field, indicated by the Arrow B. This force causes the fluid to flow in the channel. Thus the force may be seen as $F=I \times Bw$. Therefore, the pressure P due to Lorentz force F is $P=F/A$, where A is the area of wh, or $A=wh$, and thus $P=IB/h$, where I is perpendicular to B.

Figure 2:
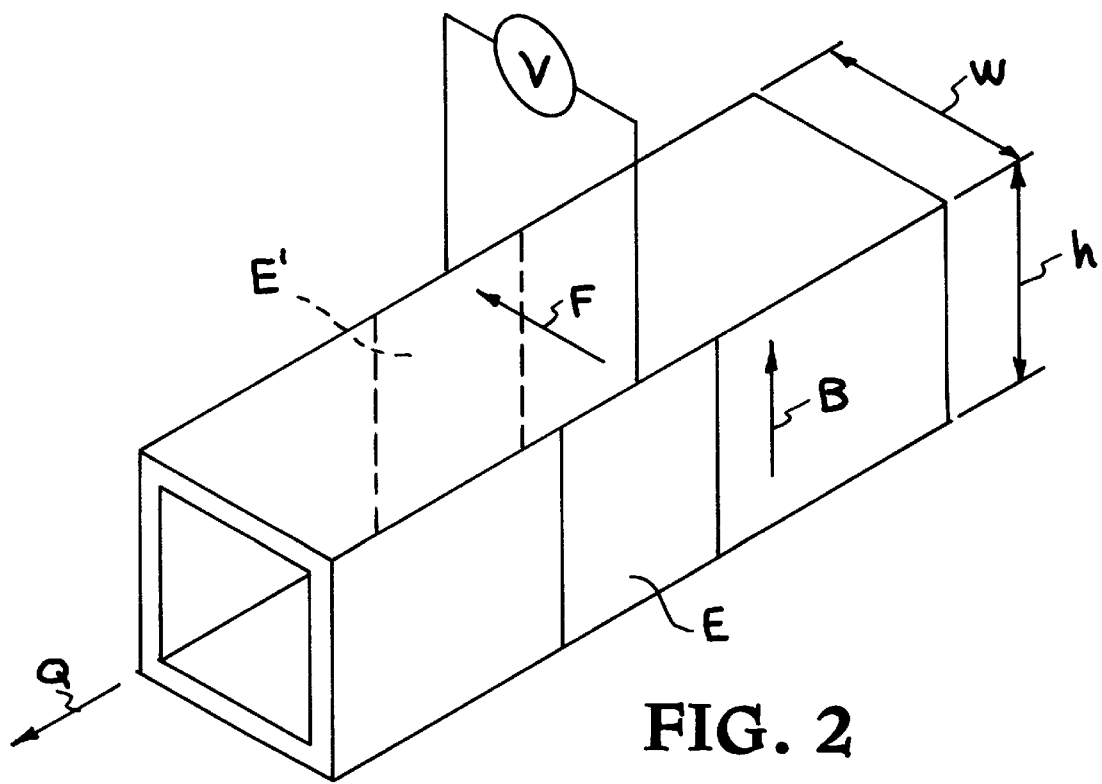
FIG. 2 schematically illustrates an MHD flow meter made in accordance with the present invention.

FIG. 2 schematically illustrates an MHD flow meter wherein, given a volumetric flow rate, indicated by the Arrow Q, of a conducting liquid passing through a channel having a width w and height h, a voltage V, which equals QB/h, is induced between two electrodes indicated at E and E' located on opposite sides of the channel, with the Arrow F indicating the force ($F=I \times Bw$).

An MHD viscosity meter can be produced using an MHD pump and an MHD flow meter in series. Applying a current to the MHD pump produces a flow which induces a voltage on the MHD flow meter. Since I and B are known, viscosity can be deduced.

Figure 3:
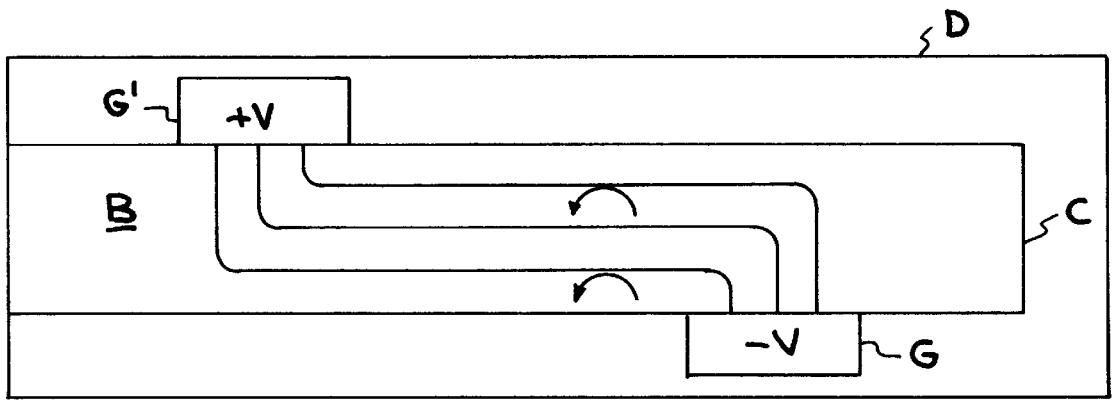
FIG. 3 schematically illustrates a side view of an MHD mixer made in accordance with the present invention.

FIG. 3 schematically illustrates a side view MHD mixer wherein a flow channel C is formed in a member D and electric current flows from an electrode G of −V to an electrode G' of +V in a magnetic field B. When current flows through two different conducting liquids in channel C, in motion between the two electrodes G and G' across the edge of a magnetic field, the j×B body force spins the fluid elements, creating vorticity that is counterclockwise, as indicated by the curved arrows, wherein j is the current density. This allows the two conducting liquids to be mixed.

Figure 4:
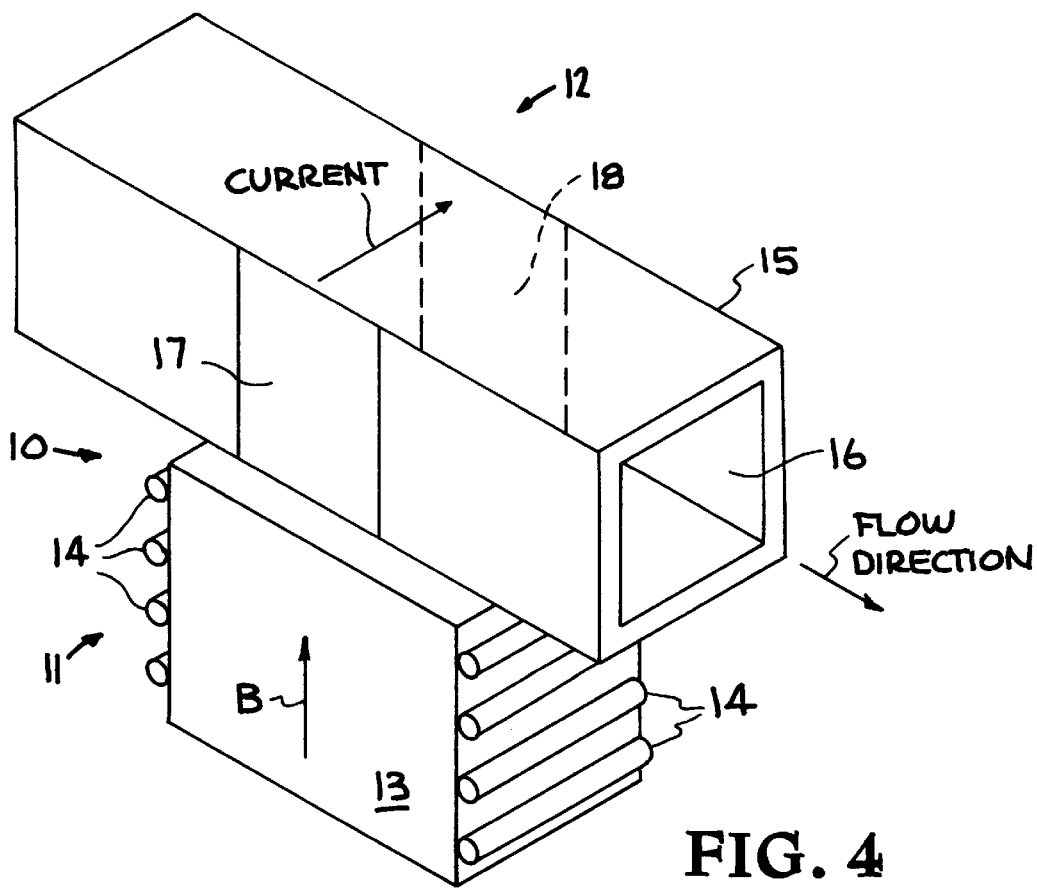
FIG. 4 illustrates an embodiment of a micropump element utilizing the principle of MHD applied thereto.

FIG. 4 illustrates an embodiment of an MHD micropump. The embodiment, as illustrated and generally indicated at 10, comprises a magnet section 11 and a pump section 12. The magnet section 11 includes a magnetic core 13 and a coil 14, which produces a magnetic field B flowing in the direction indicated by the arrows. The pump section 12 includes a body 15 having a flow channel 16 extending there through, and a pair of electrodes 17 and 18 positioned adjacent the flow channel 16 and connected to a power supply, not shown. As seen in FIG. 4, the electric current direction indicated by the current arrow and the magnetic field direction indicated by Arrow B are perpendicular to each other and to the flow direction arrow. Reverse flow through channel 16 may be produced by either reversing the direction of electric current between electrodes 17 and 18, or by reversing the direction of magnetic field B. Also, since the fluid in the flow channel is electrically conductive, flow there through may be controlled by amount of electrical current passing between the electrodes and/or the strength of the magnetic field. Thus the MHD pump of FIG. 4 will generate continuous or reversible flow through the flow channel, with readily controllable flow rates.

When the location of electrodes 17 and 18 of the FIG. 4 embodiment are offset in the flow direction, the Lorentz force produces a resultant swirling motion for vortex generation through the flow channel. The electrodes may be offset by using a different photomask where the pattern is offset.

By placing two pairs or sets of electrodes, such as electrodes 17 and 18 in FIG. 4, adjacent to each other along the flow channel 16, a valve plug can be realized by using one pair as a flow meter and using the other pair as a pump to apply an equal but opposite pressure to stop flow.

Figure 5:
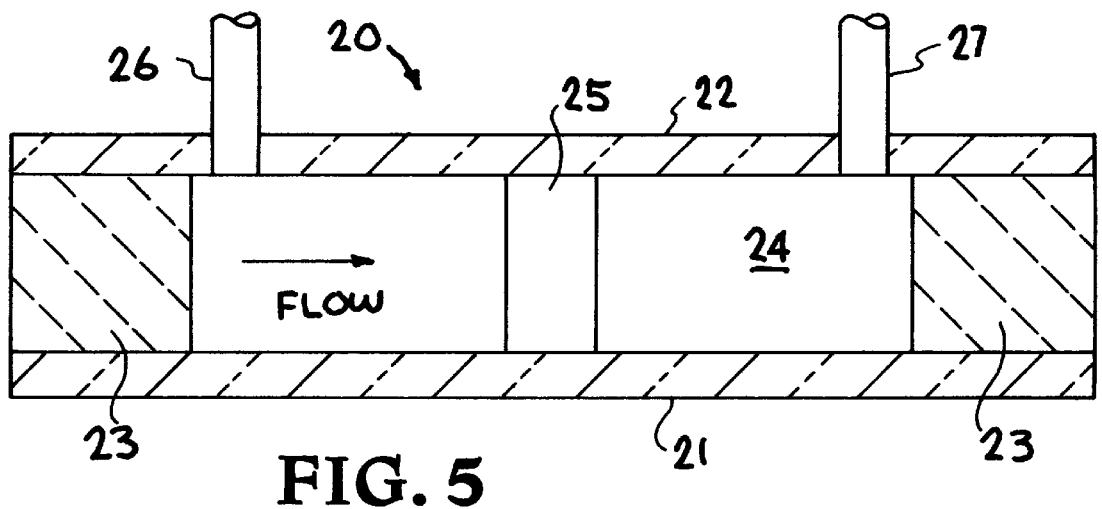
FIG. 5 illustrates in cross-section a micromachined silicon-glass-silicon MHD pump.

FIG. 5 illustrates in cross-section a test setup for MHD pumping calibration, involving a micromachined glass-silicon-glass MHD pump. As shown in FIG. 5, the MHD pump, generally indicated at 20, comprises a pair of glass members or plates 21 and 22 secured as by anodic bonding to a silicon member 23 having a channel 24 therein in which is located a pair of spaced electrodes 25, as in the FIG. 4 embodiment, but only one illustrated. An inlet tube 26 and an outlet tube 27 extend through openings in glass member or plate 22 to provide fluid communication with channel 24. Tests conducted using the arrangement of FIG. 5, and with a magnet, not shown, to produce a magnetic field perpendicular to the flow direction arrow through channel 24, and with a power supply, not shown, to produce an electric current through electrodes 25, also in a direction perpendicular to the flow direction arrow in channel 24, verified that fluids can be propelled or pumped via MHD and thus due to this advantageous scaling phenomenon, such lends itself to micromachining by integrating microchannel with microelectrodes.

Figure 6:
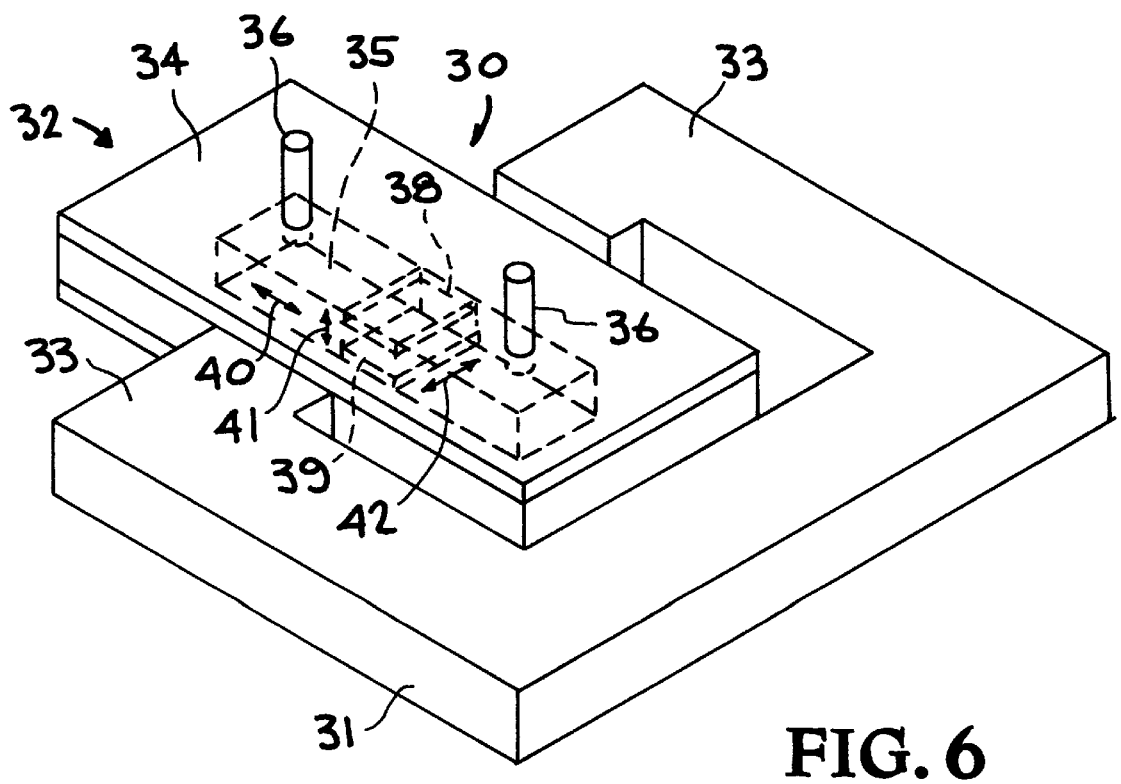
FIG. 6 is a perspective view of a test structure to demonstrate a micromachined MHD micropump element.

FIG. 6 schematically illustrates a test arrangement showing a permanent magnet and the test pump, which is similar to the FIG. 5 embodiment. As shown, the arrangement generally indicated at 30 comprises a permanent magnet section 31 and of a C-shaped configuration, and a micropump 32, with the micropump 32 being located between legs 33 of the C-shaped magnet 31. The micropump 32 comprises a body 34 having a channel 35 therein. The body 34 may, for example, be a silicon-glass-silicon sandwich as in FIG. 5. An inlet 36 is located at one end of channel 35 and an outlet 37 is located at the opposite end of channel 35. A pair of electrodes 38 and 39 are patterned and formed in channel 35 and connected to a power supply, not shown, with electrode 38 being located at the top of channel 35 and electrode 39 being located at the bottom of channel 35. As shown, and as described above, fluid flow indicated by Arrow 40 in channel 35 is reversible, the direction of the fluid flow being determined by the direction of the electrical flow between electrodes 38 and 39, indicated by the Arrow 41, and/or the direction of the magnetic field indicated by the Arrow 42. Regardless of fluid flow direction (Arrow 40) through channel 35, the electrical current direction (Arrow 41) and the magnetic field direction (Arrow 42) are perpendicular to each other.

Figure 7A:
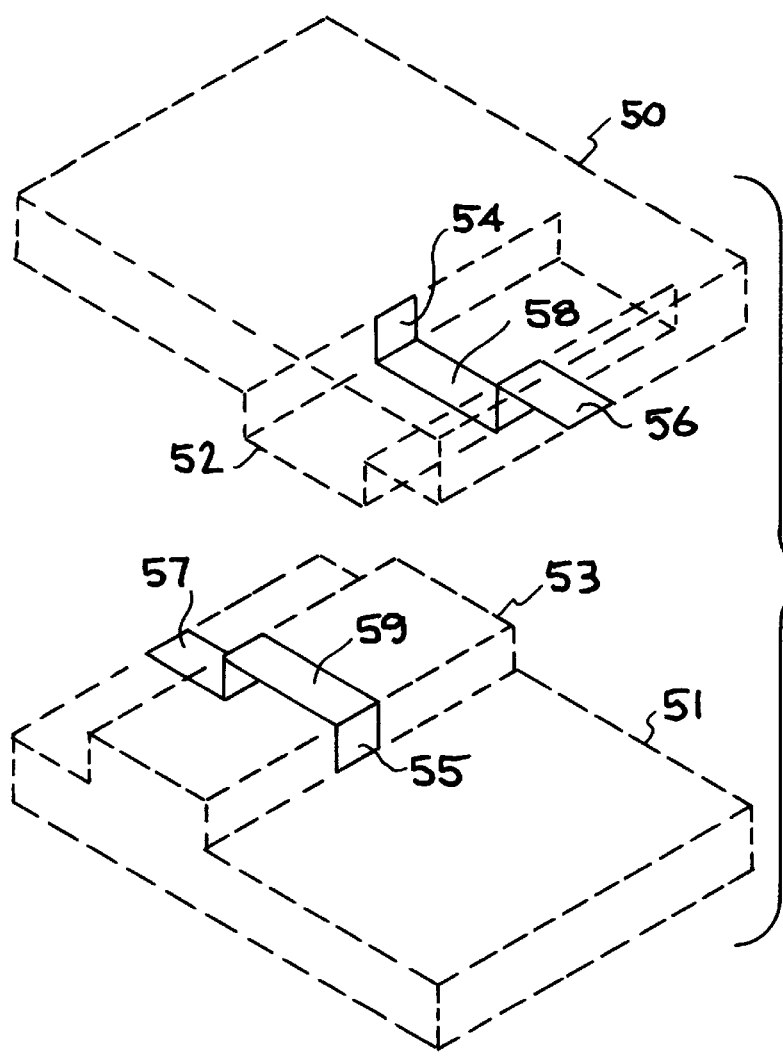
FIGS. 7A and 7B illustrate a process for fabricating vertical electrodes in microchannels.
Figure 7B:
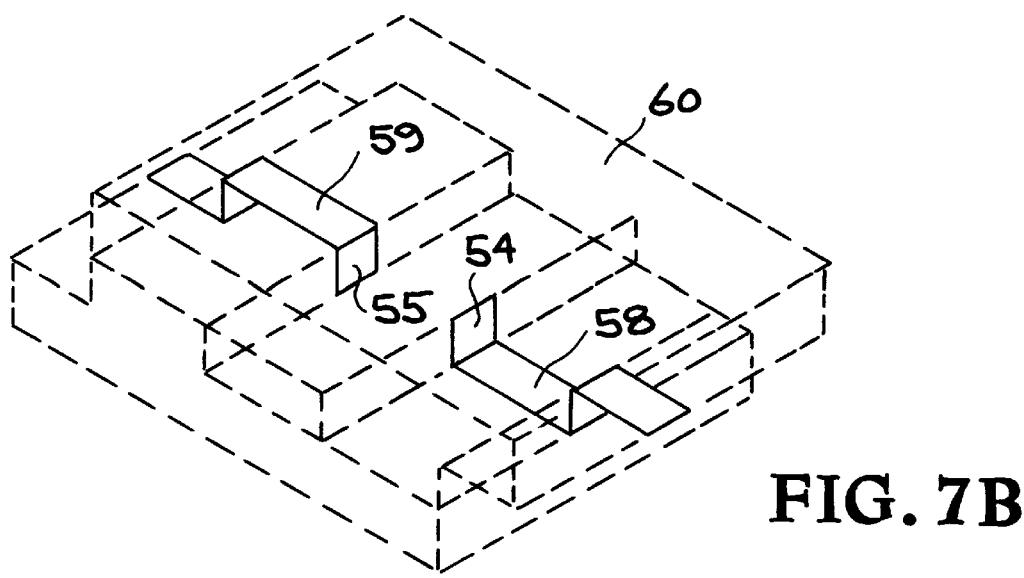

One of the problems associated with the fabrication of microdevices, such as the MHD pumps of FIGS. 5 and 6, wherein two electrodes are located across a fluid flow channel, is how to fabricate the electrodes. FIGS. 7A and 7B illustrate a fabrication process wherein the two electrodes are formed separately on a glass-silicon support, after which they are bonded together to form the fluid flow channel there between. As shown in FIG. 7A, which is an exploded view, a pair of glass members or plates 50 and 51 are bonded, such as by anodic bonding to silicon members 52 and 53, and layers of conductive metal, such as Pt, are deposited on the silicon members 52 and 53 and glass plates or members 50 and 51 to form electrodes 54 and 55, and to form electrical leads 56 and 57. After formation of the individual electrodes 54 and 55 and their respective electrical leads 56 and 57 having horizontal portions 58 and 59, the glass members or plates 50 and 51 are bonded to the silicon surrounding horizontal portions 58 and 59 of electrical leads 56 and 57 so as to form a channel 60 located between electrodes 54 and 55, as shown in FIG. 7B.

Figure 8:
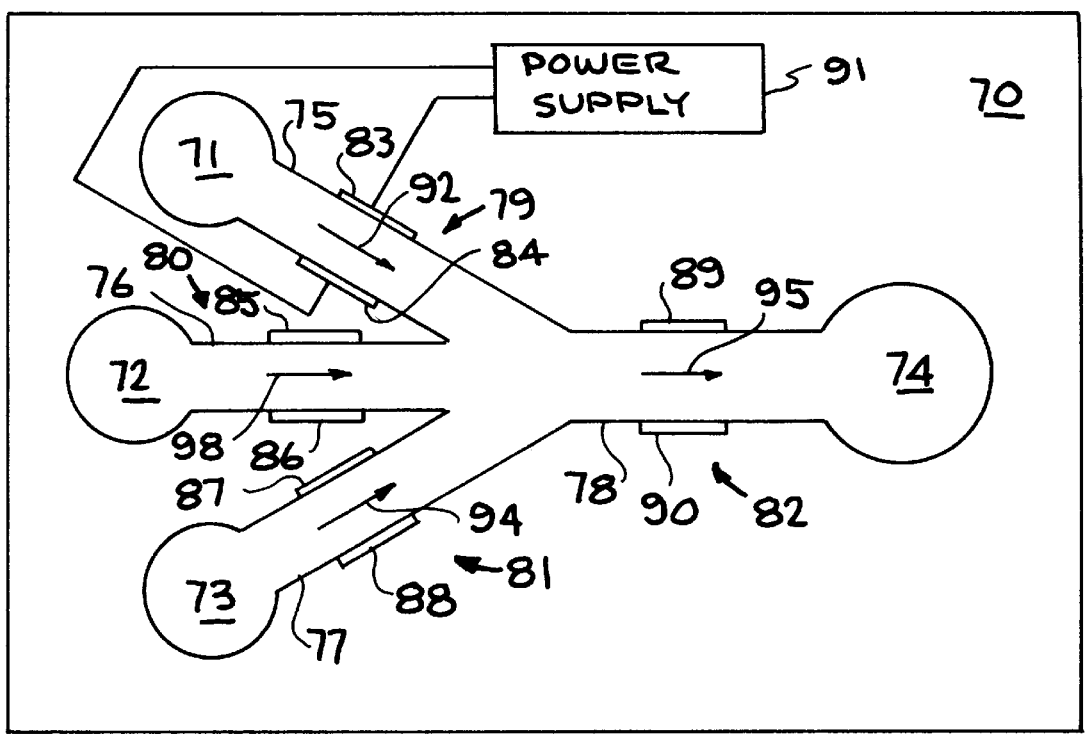
FIG. 8 illustrates a fluidic system utilizing a plurality of MHD micropumps.

FIG. 8 schematically illustrates a microfluidic system, incorporating a plurality of MHD micropumps. The microfluidic system of FIG. 8 is formed in plate or member 70, which may be constructed as described above with respect to FIG. 5, and includes a plurality of inlets 71, 72, and 73, and a single outlet 74 interconnected via channels 75, 76, 77 and 78, in which MHD micropumps 79, 80, 81, and 82, each having pairs of electrodes positioned as indicated at 83-84, 85-86, 87-88, and 89-90. While not shown, a permanent magnet or electromagnetic coil is located externally beneath plate 70 to provide a magnetic field as described above. Also, each of the pairs of electrodes are connected to a power supply, as indicated at 91 for electrode pair 83-84. For example, the inlets 71, 72, and 73 may be connected to receive a sample, a buffer fluid, and a reagent, which are pumped by MHD pumps 79, 80, ad 81, s indicated by Arrows 92, 93, and 94 through channels 75, 76, and 77, into the common or mixing channel 78, and the mixture in channel 78 is pumped by MHD pump 82 as indicated by Arrow 95 to outlet 74.

Figure 9:
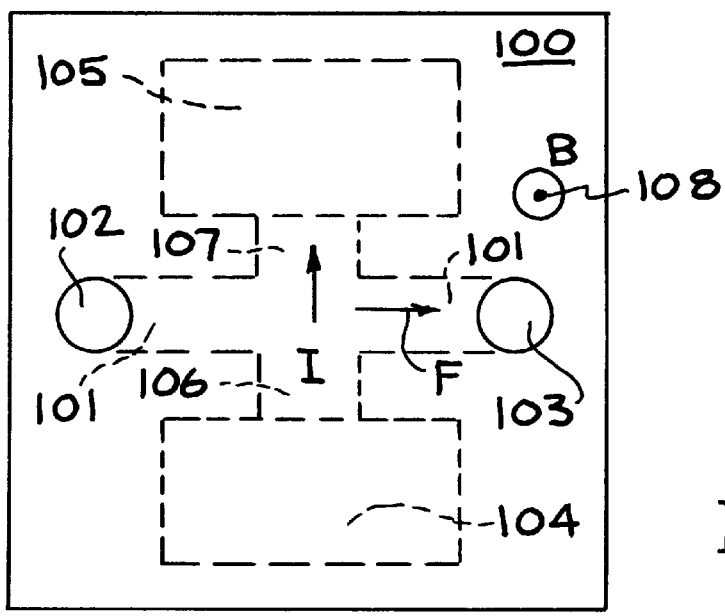
FIG. 9 illustrates a top view of another embodiment of an MHD micropump with components shown by dash lines.

FIG. 9 illustrates another embodiment of an MHD micropump with the component illustrated by dash lines. In this embodiment the electrodes are placed away from the fluid flow channel so bubble formation does not interfere with the flow. When a voltage is applied across the two electrodes, current is present across the flow channel in the presence of a magnetic field, producing a flow in the direction given by the Lorentz force. As shown, a member 101, which may be a glass-silicon-glass sandwich, for example, is provided therein with a flow channel 101 having an inlet 102 and an outlet 103, a pair of electrodes 104 and 105 spaced from the flow channel 101 by passageways 106 and 107. A magnetic field B is illustrated at 108.

In operation, when a voltage is applied between electrodes 104 and 105 with a fluid in the flow channel 101, a current flows, as indicated by Arrow I, from electrode 104 to electrode 105 and across the fluid in flow channel 101, and when a magnetic field is present as indicated at 108, a flow of fluid from inlet 102 toward outlet 103, as indicated by Arrow F, is produced. The direction of the fluid flow in flow channel 101 is determined by the direction of the magnetic field due to the Lorentz force.

Figure 10A:
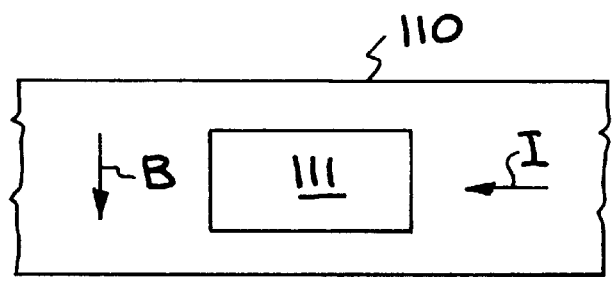
FIGS. 10A, 10B, and 10C illustrate an embodiment of an MHD or Lorentz force valve, with FIG. 10A showing a top view, FIG. 10B showing a cross-section with no current.
Figure 10B:
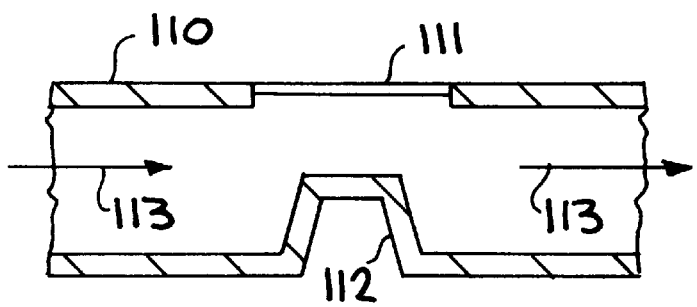
Figure 10C:
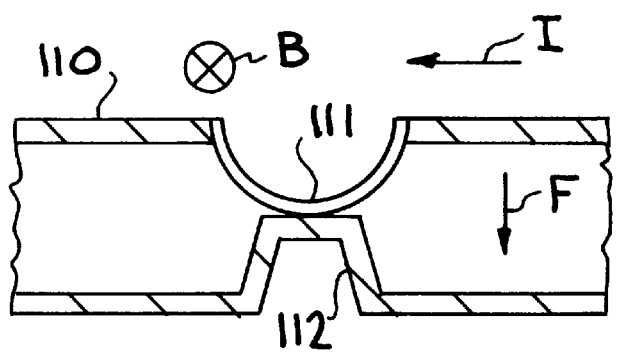

FIGS. 10A–10C illustrate an embodiment of a Lorentz force valve. As shown, FIG. 10A is a top view illustrating a flow channel 110, which may be constructed of silicon, having a membrane 111 coated with a metal mounted therein, with an electrical current flow in the direction indicated by Arrow I between electrodes, not shown, and a magnetic field in the direction of Arrow B. The cross-sectional side views of FIGS. 10B and 10C show no current flow. As seen in FIG. 10B, with there being no current flow, the flow channel 110 is open to allow fluid to flow past seat 112 in channel 110, as indicated by Arrows 112. As shown in FIG. 10C, when a current, indicated by Arrow I, is applied across the membrane 111 in the presence of a magnetic field, indicated at B, which is perpendicular to the current direction, a force, indicated by the Arrow F, that is perpendicular to both current flow and magnetic field direction, causes the membrane 111 to deflect downwardly against seat 112 and close the valve thereby stopping fluid flow therethrough.

It has thus been shown that the present invention involves MHD for microfluid propulsion, the microfabrication of MHD components such as pumps and sensors, and the integration of multiple pumps in a microfluidic system. Applications for such pumps and sensors are numerous, including biotech instrumentation, environmental sensing/monitoring, medical devices for analyzing and processing biological samples, and pumps for drug delivery, etc. The greatest advantage of this invention is that all such devices can be integrated on one platform with one general microfabrication process.

While particular embodiments, materials, parameters, etc., have been set forth to exemplify and teach the principles of the invention, such are not intended to be limiting. Modifications and changes may become apparent to those skilled in the art, and it is intended that the invention be limited only by the scope of the appended claims.

What is claimed is:

1. In a fluidic system, the improvement comprising a magnetohydrodynamic microdevice having a magnetic section and a fluidic section including a silicon member, at least one pair of spaced electrodes being located in a flow channel of the silicon member, said microdevice being selected from the group consisting of actuators and sensors, and wherein fluid flow in the flow channel is perpendicular to both a magnetic field and electrical current between the electrodes.

2. The improvement of claim 1, wherein said microdevice comprises a micropump, and wherein said micropump is capable of providing continuous flow, reversible flow, and controllable flow rates.

3. The improvement of claim 1, wherein location of said electrodes are offset in flow direction, whereby a swirling vortex flow is generated in the flow channel to provide mixing.

4. The improvement of claim 1, wherein two adjacent pairs of electrodes are located in the fluid channel, whereby a valve plug is produced by using one pair as a flow meter and another pair as a pump to oppose flow.

5. The improvement of claim 1, wherein said magnet section is selected from the group of permanent magnets and AC magnets, and said fluidic section selected from the group of actuators and sensors.

6. The improvement of claim 5, wherein said fluidic section comprises a body having said silicon member with the flow channel therein, and said at least one pair of electrodes is positioned on opposite sides of said flow channel.

7. The improvement of claim 6, additionally including a voltmeter connected across said at least one pair of electrodes.

8. The improvement of claim 5, wherein said permanent magnet is of a C-shaped configuration, and wherein said fluidic section is located intermediate leg sections of said C-shaped magnet.

9. The improvement of claim 5 wherein said magnet is located beneath said fluidic section.

10. The improvement of claim 1, wherein said flow channel is adopted to contain two different conductive fluids extending between a negative electrode and a positive electrode, whereby the two electrically conductive fluids are mixed by a vorticity created by the magnetic field and the electric current flowing through the two conductive fluids.

11. The fluidic system of claim 1, comprising a plurality of flow channels extending from a plurality of inlets to a single outlet, and a plurality of microdevices comprises micropumps, each having a pair of electrodes, positioned in each of said flow channels, whereby fluid is pumped from said inlets through said flow channels to said outlet.

12. The improvement of claim 1, wherein said at least one pair of electrodes located in said flow channel are each located on a member, said members being bonded together define said silicon member and to form said flow channel intermediate said members and said electrodes, said electrodes being connected to electrical leads extending from said members.

13. The improvement of claim 12, wherein each of said members includes a glass section and a silicon section secured to said glass section, wherein each of said electrodes are formed on a portion of said silicon section, and wherein each of said electrical leads are formed on another portion of said silicon section and on a portion of said glass section.

14. The fluidic system of claim 1, wherein said microdevice comprises a viscosity meter, said viscosity meter being composed of a micropump having a flow channel and a pair of spaced electrodes, and a micro-flow meter having a flow channel, a pair of electrodes and a volt meter, connected in series, whereby applying an electrical current to the micropump produces a flow which induces a voltage on the micro-flow meter, and since a value of the electrical current and a value of the magnetic field are known, viscosity of fluid in the flow channel can be determined.

15. The fluidic system of claim 1, wherein said flow channel includes a membrane which is deflected to function as a valve.

16. In a fluidic system, the improvement comprising a magnetohydrodynamic microdevice having at least one pair of spaced electrodes being located in a flow channel,
   said microdevice comprising a magnet section selected from the group of permanent magnets and AC magnets, and a fluidic section selected from the group of actuators and sensors,
   said fluidic section comprising a body having said flow channel therein, and said at least one pair of electrodes being positioned on opposite sides of said flow channel,
   said body being composed of a glass-silicon-glass sandwich construction, said flow channel and said electrodes being located in the silicon section of said sandwich, and including an inlet and an outlet for said flow channel,
   wherein fluid flow in the flow channel is perpendicular to both a magnetic field and electrical current between the electrodes.

17. The improvement of claim 16, wherein said electrodes are located in a spaced relation with respect to said flow channel.

18. An MHD microdevice comprising a magnetic section and a fluidic section,
   said fluidic section being composed of a glass-silicon structure,
   said fluidic section including a fluid flow channel and a pair of electrodes on opposite sides of said flow channel,
   said fluid flow channel being located in a silicon portion of said structure,
   said pair of electrodes being adapted to be connected to a power source for producing electrical current across said electrodes,
   whereby the direction of the electrical current through said electrodes and the direction of a magnetic field produced by said magnet section are perpendicular to each other and to a direction of fluid flow in said flow channel, causes fluid to flow in said flow channel.

19. The MHD microdevice of claim 18, wherein fluid flow in said flow channel is reversed by reversing the direction of either the electrical current or the magnetic field.

20. The MHD microdevice of claim 18, additionally including a volt meter connected across said electrodes, whereby the microdevice forms a flow meter.

21. The MHD microdevice of claim 19, connected in series with an MHD microdevice without a volt meter forms an MHD viscosity meter.

22. The MHD microdevice of claim 18, wherein said pair of electrodes are positioned in spaced relation to said flow channel to reduce problems associated with bubble formation.

23. The MHD microdevice of claim 18, wherein said flow channel includes a seat and a membrane therein, whereby current flow between said electrodes causes said membrane to deflect against said seat and stop fluid flow through said flow channel.

* * * * *